Patented July 1, 1930

1,769,659

UNITED STATES PATENT OFFICE

WILLIAM ARTHUR WILLIAMS, OF EDINBURGH, SCOTLAND

ELECTRODEPOSITION OF RUBBER

No Drawing. Application filed May 12, 1927, Serial No. 190,965, and in Great Britain March 28, 1927.

This invention relates to the electro-deposition of rubber or homologous substances from a vulcanized or unvulcanized alkaline latex.

In the processes of latex deposition as hitherto carried out, it has been necessary to use a current of sufficient potential to overcome the opposing electro-motive forces of polarization. Otherwise the electro-motive forces of polarization would act as a sufficient choke to stop the flow of current from the anode to the cathode in the latex solution, with consequent retardation or stopping of any rubber deposition.

This involves the use of an external source of current whose potential is such as to give rise to electrolysis of the aqueous portion of the latex with the consequent generation of gases at the electrodes, thereby causing porosity of the rubber deposited at the anode. Many devices have been proposed to overcome this difficulty.

The present invention is based on the fact that there is no opposing electro-motive force of polarization when electrolysis is effected of an aqueous solution of a metallic salt and an anode is employed of the same metal as that which is being deposited at the cathode, and that under these conditions the feeblest current is sufficient for the reaction.

I have found that, with such a balanced condition in the presence of rubber or like latex, deposition of the rubber takes place at the anode in a homogeneous form free from porosity such as is caused from the liberation of gaseous products.

As an example of one method of carrying out the invention, to the latex is added zinc sulphate in sufficient strength not to cause coagulation, say, to an ammoniacal latex having an alkalinity corresponding approximately to a semi-normal $\left(\frac{N}{2}\right)$ solution of ammonia and a rubber content not exceeding 30% is added zinc sulphate not exceeding 2%. The electrodes are both of zinc. A weak current not above that which will electrolyze water, namely, approximately 1.5 volts, is sufficient to cause the necessary reaction, and the rubber is deposited from the latex free from porosity on that electrode acting as the anode.

I do not confine myself to the materials, chemicals, quantities or percentages of same herein mentioned, nor to the strength of current employed, these being only given as examples.

It is desirable to change the direction of the current after each complete deposition, as in the precess metal is dissolved from the anode and deposited at the cathode, and by repeatedly reversing the direction of the current for each alternate operation, the form of the electrode is maintained and pitting prevented. The latex can be employed in either its vulcanized or unvulcanized condition.

Other chemicals or fillers, such for example, as zinc oxide or sulphur, or other vulcanizing agents, with or without accelerators of vulcanization, which do not cause premature coagulation of the latex, may be added before introducing the electrodes, in order that such chemicals or fillers will become incorporated with the deposited rubber.

Claims:

1. A process for the electro-deposition of rubber or homologous substances from latex, which consists in the addition to the latex of a metallic salt without effecting coagulation of the latex, and thereafter subjecting the salt to electrolysis in the presence of an anode electrode of the same metal as the salt.

2. A process for the electro-deposition of rubber or homologous substances from latex, which consists in the addition to the latex of a metallic salt without effecting coagulation of the latex, and thereafter subjecting the solution to electrolysis in the presence of an anode electrode of the same metal as the salt, by the use of an external source of current of insufficient potential to overcome polarization in the absence of the metallic salt.

3. A process for the electro-deposition of rubber or homologous substances from latex, which consists in the addition to the latex of a metallic salt without effecting coagulation of the latex and thereafter subjecting the solution to electrolysis in the presence of electrodes both of the same metal as the salt.

4. A process for the electro-deposition of rubber or homologous substances from latex, which consists in adding zinc sulphate to the latex, in insufficient quantity to effect coagulation, immersing a pair of zinc electrodes in the latex, and connecting the electrodes with an external source of a current of a potential not exceeding 1.5 volts.

The foregoing specification signed at Edinburgh, Scotland, this twentieth day of April, 1927.

WILLIAM ARTHUR WILLIAMS.